(12) United States Patent  
Kadambe

(10) Patent No.: US 8,442,591 B1
(45) Date of Patent: May 14, 2013

(54) BLIND SOURCE SEPARATION OF CO-CHANNEL COMMUNICATION SIGNALS

(75) Inventor: Shubha L. Kadambe, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 63 days.

(21) Appl. No.: 13/249,119

(22) Filed: Sep. 29, 2011

(51) Int. Cl.
*H04M 1/00* (2006.01)

(52) U.S. Cl.
USPC .............. 455/562.1; 455/561; 455/67.11

(58) Field of Classification Search ............. 455/562.1, 455/522, 69, 561, 503, 67.11, 67.13, 67.15; 704/203, 205–206
See application file for complete search history.

(56) References Cited

U.S. PATENT DOCUMENTS

| | | | | |
|---|---|---|---|---|
| 5,347,305 A * | 9/1994 | Bush et al. | | 348/14.01 |
| 5,568,519 A * | 10/1996 | Baier et al. | | 375/343 |
| 5,959,966 A * | 9/1999 | Torkkola | | 370/203 |
| 7,248,656 B2 * | 7/2007 | da Silveira et al. | | 375/346 |
| 7,647,209 B2 * | 1/2010 | Sawada et al. | | 702/190 |
| 7,826,870 B2 * | 11/2010 | Shu et al. | | 455/562.1 |
| 8,044,130 B2 * | 10/2011 | Miyamoto et al. | | 524/436 |
| 8,144,759 B2 * | 3/2012 | Mikhael et al. | | 375/233 |
| 2003/0061035 A1 * | 3/2003 | Kadambe | | 704/203 |
| 2007/0094171 A1 * | 4/2007 | Burges et al. | | 706/16 |
| 2009/0240505 A1 * | 9/2009 | Villemoes et al. | | 704/500 |
| 2012/0065891 A1 * | 3/2012 | Ikelle et al. | | 702/17 |

OTHER PUBLICATIONS

Bell, A. J., et al., An Information-Maximization Approach to Blind Separation and Blind Deconvolution, Neural Computation, Vo. 7, pp. 1129-1159, 1995.

* cited by examiner

*Primary Examiner* — Dominic E Rego
(74) *Attorney, Agent, or Firm* — Donna P. Suchy; Daniel M. Barbieri

(57) ABSTRACT

A method and system are shown and described for separating, on a communication channel, multiple complex communication signals originating from corresponding multiple communication sources. The method includes estimating separate complex communication signals using an unmixing matrix. The unmixing matrix is recursively updated by transforming the estimated complex communication signals into real numbers for use with a gradient-based training module. The gradient-based training module is configured to use the real numbers to calculate learning rule updates to apply to the unmixing matrix. The gradient-based training module is configured to minimize error in the signal estimation obtained by application of the unmixing matrix. The transformation of the estimated complex communication signals into real numbers may include applying the complex communication signals to a hyperbolic tangent function.

20 Claims, 4 Drawing Sheets

BLIND SOURCE SEPARATION OF CO-CHANNEL COMMUNICATION SIGNALS

BACKGROUND

The present disclosure relates generally to the field of signal receivers. More specifically, the present disclosure relates to signal separation in an environment having multiple signal sources transmitting on the same channel.

Electronic warfare systems generally used in military operations receive a mixture of multiple simultaneously existing RF signals. The mixed signals need to be separated in order to accurately identify the individual RF signals for better situation awareness.

Conventional systems use a bank of filters to separate signals that do not overlap in time and frequency, and are able to detect signals present in different channels. However, signals often overlap in time and frequency, and a conventional bank of filters may be incapable of separating such signals. This may result in a receiver (e.g., of an electronic warfare system) of not being able to identify multiple signals present on the same channel.

What is needed is a system and method for separating multiple signals received by an electronic warfare system or other receiver system such that multiple signals present in a co-channel are separated without prior knowledge of the signals and how the signals are mixed.

SUMMARY

One embodiment relates to a method for separating, on a communication channel, multiple complex communication signals originating from corresponding multiple communication sources. The method includes receiving, at a processing circuit, combined complex communication signals from multiple sensors, each of the multiple sensors receiving the multiple complex communication signals, wherein each of the received combined complex communication signals comprise the multiple complex communication signals mixed and with noise. The method further includes using the processing circuit to: (a) provide each combined signal to an unmixing matrix; (b) calculate, using the unmixing matrix, a single estimated complex communication signal for each communication source; (c) transform the estimated complex communication signals into real numbers for use with a gradient-based training module; (d) use the real numbers and the gradient-based training module to calculate learning rule updates representing changes for the unmixing matrix; (e) provide the learning rule updates to the unmixing matrix and update the unmixing matrix based on the learning rule update; (f) output the single estimated complex communication signal for each communication source; and (g) repeat steps a-f for a new period of time. Calculating the single estimated complex communication signal includes calculating an estimated complex communication signal for every possible multiple complex communication signal and communication source pair, and combining all estimated complex communication signals for the communication source into a single estimated complex communication signal for the communication source.

Another embodiment relates to an apparatus for separating, on a communication channel, multiple complex communication signals originating from corresponding multiple communication sources. The apparatus includes a module for estimating separate complex communication signals from mixed signals using an unmixing matrix. The apparatus further includes a module for recursively updating the unmixing matrix by transforming the estimated complex communication signals into real numbers for use with a gradient-based training module, the gradient-based training module configured to use the real numbers to calculate learning rule updates to apply to the unmixing matrix, wherein the gradient-based training module is configured to minimize error in the signal estimation obtained by application of the unmixing matrix.

Another embodiment relates to a method for separating, on a communication channel, multiple complex communication signals originating from corresponding multiple communication sources. The method includes estimating separate complex communication signals from mixed signals using an unmixing matrix. The method further includes recursively updating the unmixing matrix by transforming the estimated complex communication signals into real numbers for use with a gradient-based training module, the gradient-based training module configured to use the real numbers to calculate learning rule updates to apply to the unmixing matrix, wherein the gradient-based training module is configured to minimize error in the signal estimation obtained by application of the unmixing matrix.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for signal separation are shown. The systems and methods of the present disclosure use blind source separation (BSS) to separate mixed signals received by an electronic warfare system or other system. The separation of the signals is accomplished by using a recursive learning rule and an estimated unmixing matrix to estimate the signals. The learning rule is applicable for complex communication signals with additive noise. Since the signals are complex, the systems and methods of the present disclosure are able to use blind source separation on complex signals.

Figure 1:
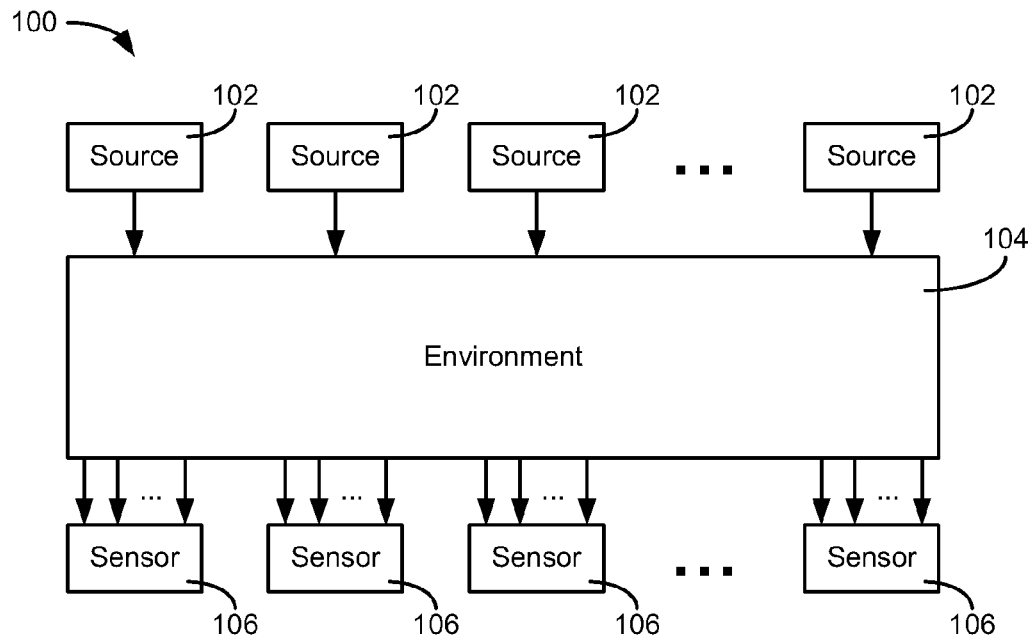
FIG. 1 is a block diagram of an environment including multiple signal sources and multiple sensors, according to an exemplary embodiment.

Referring now to FIG. 1, an environment 104 is shown where multiple signals originating from multiple signal sources 102 are received or detected by one or more sensors 106. Each source 102 may be transmitting different signals on the same channel (e.g., providing co-channel communications). Even if the sources are transmitting on the same channels, the signal transmissions from each source 102 may be of different bandwidths, different center frequencies, different communications protocols, or otherwise differently transmitted. Sources 102 may transmit during regular time intervals, e.g., according to a synchronous communications scheme, or may transmit in an asynchronous fashion. Sources 102 may be distributed across environment 104 or may be relatively close. Sources 102 may be or include a plurality of radio frequency transmitters or transmitters of other frequencies.

Within environment 104, the multiple co-channel signals from sources 102 may mix to a lesser or greater extent. The systems and methods described herein are intended to separate the signals from varying sources 102.

As shown in FIG. 1, a plurality of sensors 106 detect the multiple mixed signals that exist in environment 104. As the signals are detected by sensors 106, the origin of the detected signals are unknown and the signals are in need of separation in order to be interpreted. Sensors 106 may be or include wideband radio frequency antennas and receivers, narrow band radio frequency antennas and receivers, an antenna and receiver array, a plurality of distributed or mobile antennas and receivers, or any other configuration of multiple antennas and receivers in an environment.

The signals received at each sensor 106 are a combination of multiple source signals. The signals could be combined instantaneously (e.g., gain diversity), convolutedly (e.g., multipath propagation), or both while traveling through environment 104. How the signals are combined in environment 104 depends on the environment, which may be unknown to sensors 106. The buildings and radio frequency noise of an urban environment, for example, may affect signal mixing in a different way than a rural environment.

Each source 102 transmits one or more signals. All observed signals transmitted by all sources 102 may be represented as X, where X is a M×T matrix, where M is the number of sensors 106 detecting the signals and T corresponds with the number of times the sensors 106 detect the signals. In an exemplary embodiment, sensors 106 may detect the signals at predetermined time intervals from [1,2, . . . , t]. Therefore, X is then a matrix of a collection of detected signals from all sensors at given time intervals. The actual signal S may be represented as a N×T matrix where N is the number of sources and T is defined above. Therefore, the relationship between the observed signals X and the actual signals S may be defined as:

$$X = AS + V.$$

A is defined as a theoretical M×N matrix that is known as the "unknown mixing" matrix or mixing matrix. A represents the mixing of signals in environment 104, and the combination of the actual signal S and other signals (represented by mixing matrix A) results in the observed signal X. V is defined as a M×T noise matrix that represents noise in environment 104 that impacts the signals.

The problem of signal separation solved by the systems and methods described herein is to recover the actual signals S from the observed signals X without prior knowledge of the actual signals transmitted by sources 102 and the impact of the other signals in the environment being transmitted (represented by the mixing matrix A). Since both S and A are unknown, the signal separation technique to determine S may be referred to as "blind."

The signal separation technique includes application of an "unmixing" matrix W. The unmixing matrix W is intended to "cancel out" the effect of the theoretical mixing matrix A on the observed signals X. For example, for the signal S, if signal mixing is applied to the signal via theoretical mixing matrix A (e.g., the environment), the application of the unmixing matrix W on the mixed signal AS should result in the actual signal S (e.g., AW should be equal to the identity matrix I).

Figure 2:
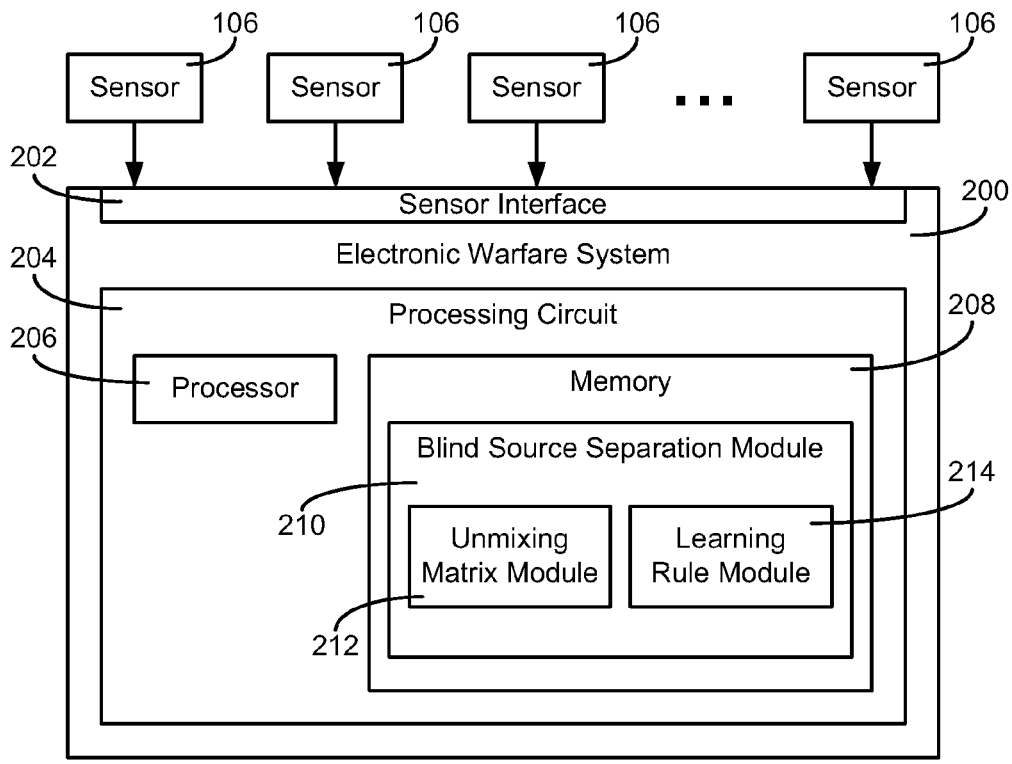
FIG. 2 is a block diagram of an electronic warfare system for separating signals, according to an exemplary embodiment.

Referring to FIG. 2, a block diagram of an electronic warfare system 200 is shown, according to an exemplary embodiment. In the embodiment of the present disclosure, electronic warfare system 200 is configured to receive signals and to separate the signals. According to various exemplary embodiments, the embodiments of the present disclosure may be used in other systems for which it is beneficial to separate mixed signals. For example, while FIG. 2 and other portions of this specification are discussed with reference to an electronic warfare system, it should be appreciated that commercial or other non-warfare receiver systems may also utilize the systems and methods described herein and should be considered within the scope of the appended claims unless the claims specifically limit to an electronic warfare system.

System 200 receives signal information from the various sensors 106 via a sensor interface 202. The signal information from sensors 106 may be observed signals X received at given time intervals. Sensor interface 202 is configured to receive the observed signals X and provide the signals to processing circuit 204 for signal separation.

It should be appreciated that sensor interface 202 may be distributed across multiple devices and that electronic warfare system may be distributed across multiple separate devices. For example, a first handheld receiver may have a first sensor 106 and a second handheld receiver may have a second sensor 106. Once signals within a frequency band are detected by the sensors, the data may be forwarded to a centralized processing circuit (e.g., a master transceiver) for processing. In the illustrated embodiment, sensors 106 are all wired to the same warfare system via a single and non-distributed sensor interface 202. Sensor interface 202 may be any suitable jacks, ports, amplifiers, or other electronic components for receiving signals from the sensors 106 and for forwarding the signals (i.e., data representative of the signals) to processing circuit 204 of system 200.

System 200 is shown to include a processing circuit 204 including a processor 206 and memory 208. Processor 206 may be implemented as a general purpose processor, an application specific integrated circuit (ASIC), one or more field programmable gate arrays (FPGAs), a group of processing components, or other suitable electronic processing components. Memory 208 is one or more devices (e.g., RAM, ROM, Flash memory, hard disk storage, etc.) for storing data and/or computer code for completing and/or facilitating the various processes described in the present disclosure. Memory 208 may be or include volatile memory or non-volatile memory. Memory 208 may include database components, object code components, script components, or any other type of information structure for supporting the various activities and information structures of the present disclosure. Memory 208 may be communicably connected to processor 206 and includes computer code or instructions for executing one or more processes described herein.

Memory 208 may store a buffer of signal information received from the plurality of sensors 206. Memory 208 may also include various modules for completing the various methods described herein. For example, memory 208 is shown to include a blind source separation (BSS) module 210. BSS module 210 is generally configured to separate mixed signals using the blind source separation routine described herein. BSS module 210 receives the observed signals X from the various sensors 106 and for each observed signal X, separates the mixed signal to determine the actual signals S. While memory 208 is shown as a single block, it should be appreciated that a plurality of memory stores and/or memory devices may be utilized by processing circuit 204. Further, it should be appreciated that a buffer of signal data may be separate from computer code for the blind source separation module in varying exemplary embodiments.

BSS module 210 is shown to include unmixing matrix module 212. Unmixing matrix module 212 is configured to receive a mixed signal and to apply an unmixing matrix to each observed signal X. The observed signals X are transformed into estimated actual signals S through application of the unmixing matrix. Unmixing matrix module 212 further receives a learning rule update from learning rule module 214. Unmixing matrix module 212 applies the learning rule update to the unmixing matrix before the unmixing matrix is used on each observed signal X.

BSS module 210 is shown to include learning rule module 214. Learning rule module 214 is configured to provide unmixing matrix module 212 with a learning rule update that may be applied to the unmixing matrix of module 212. The matrix is then applied to the mixed signals for separating the signals. Learning rule module 214 may receive an adjusted value representing the estimated actual signals S and use the values to update the learning rule (e.g., adjust the learning rule so that the next time the learning rule update is used, the estimation of the signals is more accurate). The calculation of the learning rule update is shown in greater detail in FIGS. 3-5.

Figure 3:
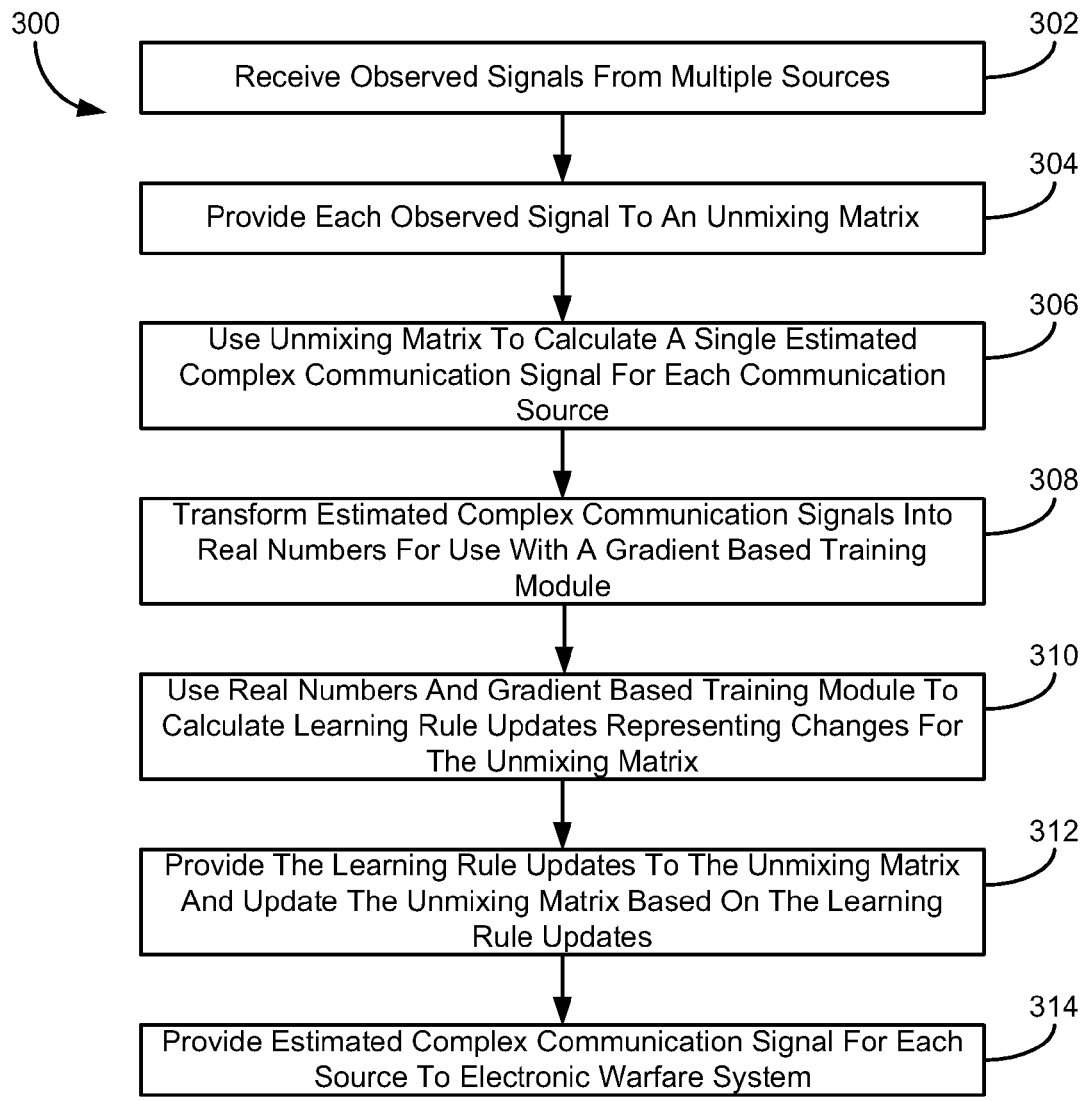
FIG. 3 is a flow chart of a signal separation process, according to an exemplary embodiment.

Referring now to FIG. 3, a flow chart of a signal separation process 300 is shown, according to an exemplary embodiment. Process 300 includes receiving observed signals from multiples sources (step 302). The observed signals may be mixed signals (e.g., multiple signals that pass through an environment and become mixed as the sensors detect the signals).

Process 300 further includes providing each observed signal to an unmixing matrix (step 304) or a module for applying the unmixing matrix. Process 300 further includes using the unmixing matrix to calculate a single estimated complex communication signal for each communication source (step 306). Each row or column in the unmixing matrix may apply to a single source or signal in the environment, according to an exemplary embodiment. For example, for an environment with three signals and three sources, the unmixing matrix may be a 3×3 matrix for which each row or column applies to a single signal or source, and each element in the matrix may apply to a particular signal and source combination. By applying the unmixing matrix to the observed signals, step 306 first calculates an estimated signal for every possible signal and source combination. Step 306 then combines each estimated signal for a given source into a single estimated signal for the source.

Process 300 further includes transforming the estimated complex communication signals into real numbers for use with a gradient based training module (step 308). According to one exemplary embodiment, a hyperbolic tangent function may be used to convert a signal into a real number in between −1 and 1. Using the real numbers and the gradient based training module, process 300 includes calculating learning rule updates representing changes in the value of the unmixing matrix (step 310). The learning rule updates may be a matrix to be summed with the unmixing matrix, according to one embodiment. The learning rule update may be one or more vectors or individual values to be summed with one or more values, rows, columns, or vectors in the unmixing matrix, according to another embodiment. The calculations of steps 308-310 are shown in greater detail in FIG. 4.

Process 300 further includes providing the learning rule updates to the unmixing matrix and updating the unmixing matrix based on the learning rule updates (step 312). The unmixing matrix may be updated recursively, according to an exemplary embodiment. Process 300 further includes providing the final estimated complex communication signal for each source to the electronic warfare system or other system (step 312). While step 312 is shown at the end of process 300, step 312 may be executed at any point after determining the estimated complex communication signals in step 306.

Figure 4:
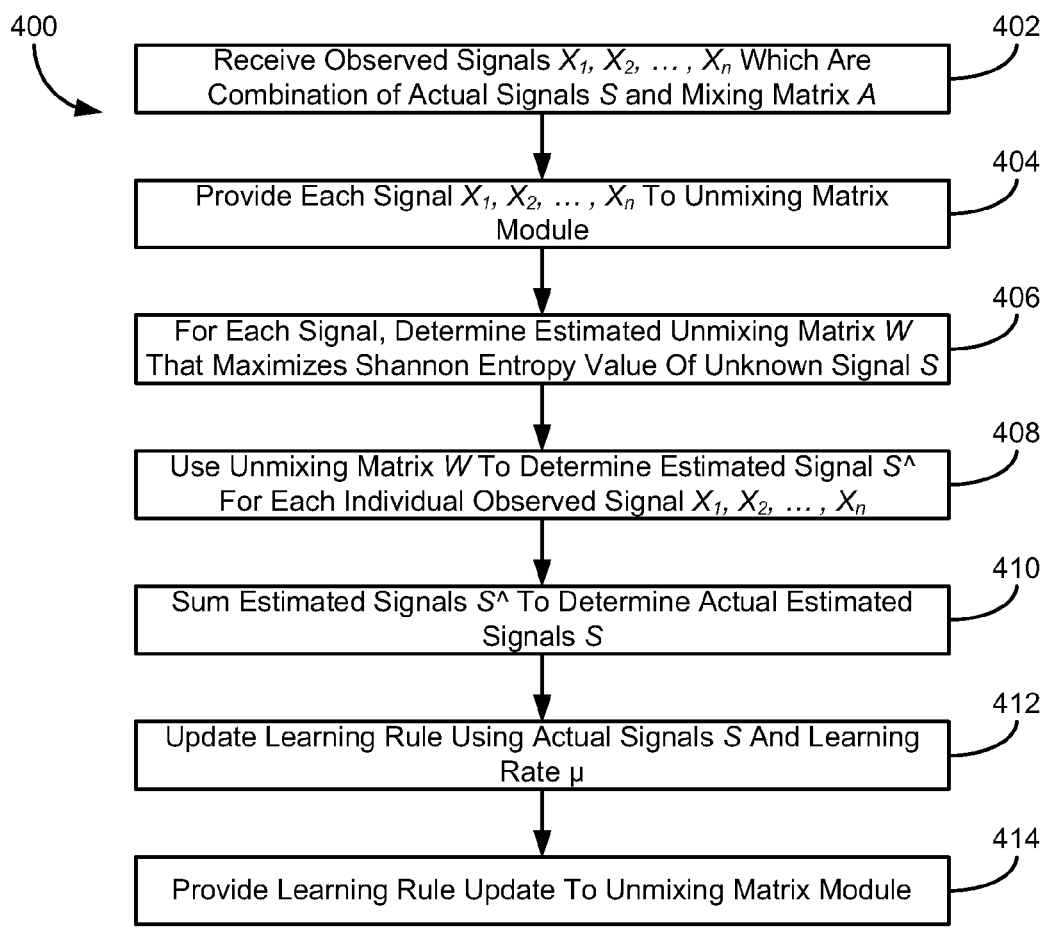
FIG. 4 is a more detailed flow chart of a signal separation process, according to an exemplary embodiment.

Referring now to FIG. 4, a more detailed flow chart of a signal separation process 400 is shown, according to an exemplary embodiment. Process 400 includes receiving observed signals and determining estimated signals using a learning rule and unmixing matrix. Process 400 details a more mathematical description of steps 308, 310 and process 300 of FIG. 3.

Process 400 includes receiving observed signals X (which is equal to AS+V as described above with reference to FIG. 1). Since A is unknown and therefore the actual signals S cannot be found by calculating $S=A^{-1}X$, process 400 estimates S by using the equation: $\hat{S}=WAX$, where W is an unmixing matrix that "cancels out" the effect of the mixing matrix A on the actual signal S. The goal of process 400 is to estimate W to determine the estimated signal $\hat{S}$, and then to use the estimation of W to recursively update W. Process 400 maximizes the mutual information between S and $\hat{S}$ (e.g., making the actual signal and estimated signal as close to each other as possible). In an exemplary embodiment, process 400 uses Shannon entropy calculations to achieve such estimations. Both W and $\hat{S}$ are complex (e.g., the elements of W and $\hat{S}$ are complex).

Process 400 includes receiving the observed signals X (e.g., multiple observed signals $X_1, X_2, \ldots X_m$ for a given time t in the matrix of total observed signals X) (step 402). The observed signals are a combination of the actual signals S and the mixing matrix A (e.g., the mixing of the signals as described in FIG. 1). For each time t for which signals were observed, an array of observed signals $X_1, X_2, \ldots X_m$ at each sensor are collected.

Process 400 further includes providing each individual signal $X_1, X_2, \ldots X_m$ (e.g., each individual matrix element) to the unmixing matrix module (step 404). The unmixing matrix module is configured to receive each individual signal and to determine an estimated signal $\hat{S}$ for each source within the environment. For example, for a signal $X_1$, the signal may be provided to the unmixing matrix module and separated into an estimated signal $\hat{S}$ for each source impacting the signal $X_1$.

Process 400 further includes steps 406-408 which calculates an estimated signal $\hat{S}$. The calculation of the estimated signal includes applying the unmixing matrix to a mixed signal from every sensor to obtain a plurality of signal estimations for each source, and combining the plurality of signal estimations for each source to obtain each estimated separate complex communications signal. Process 400 includes determining an estimated unmixing matrix W that maximizes the Shannon entropy value of an unknown signal S (step 406). The Shannon entropy H is a probability distribution that is a measure of the randomness or uncertainty of the signal. By maximizing the Shannon entropy H, the mutual information being shared between the estimated signal $\hat{S}$ and the actual signal S is maximized, therefore allowing for the most accurate estimation of the signal. Step 406 represents the application of the learning rule update to the unmixing matrix W, which is related to the Shannon entropy maximization. The Shannon entropy maximization can be represented by the equation:

$$I(S,\hat{S})=H(\hat{S})-H(\hat{S}|S)$$

where $I(S, \hat{S})$ is the mutual information shared between $\hat{S}$ and S, $H(\hat{S})$ is the Shannon entropy of the estimated signal $\hat{S}$, and $H(\hat{S}|S)$ is the conditional entropy (i.e., the amount of randomness in the variable $\hat{S}$ given S).

Process 400 further include using the unmixing matrix W to determine the estimated signal $\hat{S}$ for each individual observed signal (step 408). Step 408 includes using the unmixing matrix W found in step 406 and calculating $\hat{S}$. Using the equation:

$$\hat{S}=WAX$$

an unmixing matrix W may be "learned" such that W maximizes $\hat{S}$. The resulting $\hat{S}$ is used as the estimated signal for the given element. In the result of step 408, an estimated signal $\hat{S}$ for every signal and source combination is determined.

Process 400 further includes summing estimated signals $\hat{S}$ to determine or calculate the actual estimated signals S (step 410). For each individual observed signal determined in step 408, all individual observed signals for a given source are summed to determine the actual estimated signal S. For example, all estimated signals $\hat{S}$ for a first source are summed to determine a single estimated signal S for the first source, all estimated signals $\hat{S}$ for a second source are summed to determine a single estimated signal S for the second source, and so forth. Step 410 is shown in greater detail in FIG. 5.

Process 400 further includes updating the learning rule using the determined actual signals S and a learning rate $\mu$ (step 412). The determined actual signals S are converted from a complex signal format to a real number. For example, a hyperbolic tangent function may be used to convert the complex signal into a number between −1 and 1. The updating of the learning rule may be recursive (e.g., the learning rate equation may be a function of the previous learning rate equation and the change in the actual signals determined). The calculation in step 412 is shown in greater detail in FIG. 5.

The learning rate $\mu$ is a value used to control the impact of the latest estimated signals on the unmixing matrix and learning rule update. For example, if there is a dramatic change in an estimated signal that would result in a significant change in the learning rule update and unmixing matrix, the learning rate $\mu$ may be used to control the change such that the learning rule update and unmixing matrix does not overcompensate for the change. As another example, the learning rate $\mu$ may be used to accentuate or increase the impact of a small change in estimated signals if changes in estimated signals are judged to not have enough of an impact on the learning rule update and unmixing matrix. The learning rule $\mu$ generally optimizes the learning rule update and unmixing matrix by controlling the impact of the previous estimated signals on the estimation of the new signals. Step 412 may include applying the learning rule $\mu$ as well as determining an appropriate value for $\mu$.

Process 400 further includes providing the learning rule update to the unmixing matrix module for further signal separation (step 414). Step 414 includes applying the learning rule update to the unmixing matrix W in order to update the unmixing matrix W.

Figure 5:
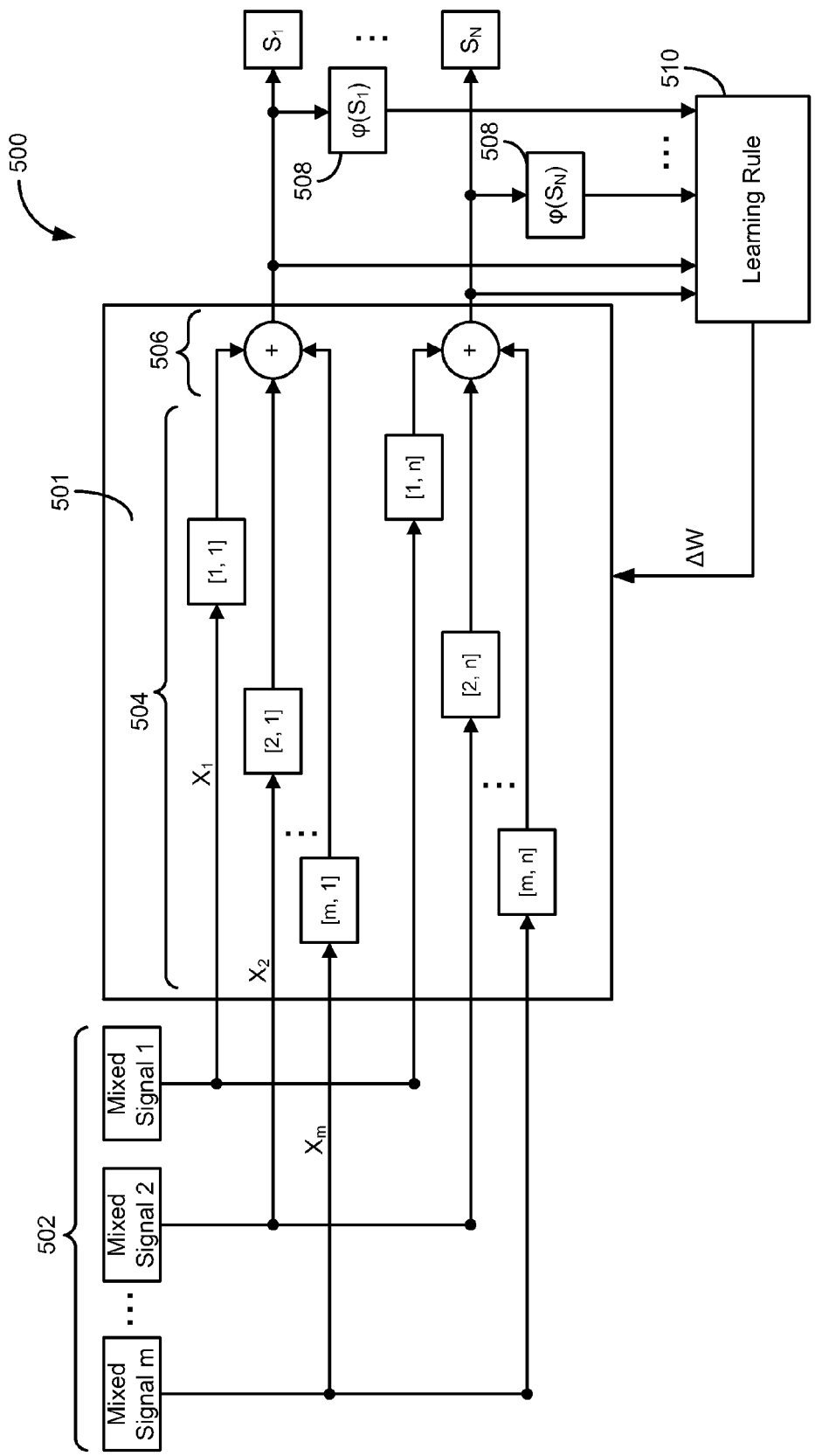
FIG. 5 is a block diagram of a signal separation system including a learning rule module and unmixing matrix module, according to an exemplary embodiment.

Referring now to FIG. 5, a block diagram of a signal separation system 500 is shown. In the embodiment of FIG. 5, multiple mixed signal inputs 502 (e.g., observed signals X) are shown fed into unmixing matrix 501 of signal separation system 500. Unmixing matrix 501 is shown with an array of vectors 504, each vector representing a mixed signal and source combination. The configuration shown represents, for each mixed signal 502, the signal being passed through a vector 504 (e.g., matrix element) for each possible source mixed signal 502 may have originated from. Using each vector 504, the signals are separated and a signal sent from a specific source is determined for each mixed signal 502.

In the example embodiment of FIG. 5, mixed signal 1 is provided to a vector [1,1], a vector [1, 2], and so on to a vector [1, n], where N is the number of sources. Vector [1,1] is configured to receive the first mixed signal and determine a signal originating from a first source; vector [1, 2] determines a signal originating from a second source, and so forth. After extracting an estimated signal using vectors 504, all the estimated signals for a particular source are summed together to determine an actual signal S (e.g., step 410 of FIG. 4) at summing module 506. The signals $(S_1, \ldots, S_N)$ are then provided to the electronic warfare system or other system.

Each of the signals $(S_1, \ldots, S_n)$ are passed through a hyperbolic tangent function module 508 before being provided to learning rule module 510 (e.g., a gradient-based training module). Learning rule module 510 applies a stochastic gradient adaptive algorithm. The equation of the hyperbolic tangent function is below:

$$\phi(S)=\tan h(S).$$

Learning rule module 510 receives the signal information from module 510 and uses the signal information to update the learning rule. The learning rule is obtained by minimizing the cost function:

$$W = \sum_{i=1}^{N} E\left[||S_i|^2 - 1|^2\right] - \ln|\det W^H|$$

where W is the unmixing matrix and H is a Hermitian operator (for complex conjugation).

As mentioned above, the updating of the learning rule is recursive. The learning rule update can be represented at:

$$W(k+1)=W(k)+\mu\Delta W(k)$$

where $\mu$ is the learning rate as described in step 414 of process 400 (e.g., a rate that may be set that allows the user to adjust how much impact the calculated signals have on the learning rule equation). $W(k+1)$ is the updated learning rule and $\Delta W(k)$ represents the change in the learning rule. $\Delta W(k)$ may be defined as:

$$\Delta W(k)=I+4(\text{conj}(\phi(S)^T)S)W(k)$$

where I is the identity matrix and conj is the conjugation operation.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for separating, on a communication channel, multiple complex communication signals originating from corresponding multiple communication sources, comprising:
   receiving, at a processing circuit, combined complex communication signals from multiple sensors, each of the multiple sensors receiving the multiple complex communication signals, wherein each of the received combined complex communication signals comprise the multiple complex communication signals mixed and with noise;
   using the processing circuit to:
     (a) provide each combined signal to an unmixing matrix;
     (b) calculate, using the unmixing matrix, a single estimated complex communication signal for each communication source, wherein calculating the estimated complex communication signal comprises calculating an estimated complex communication signal for every possible multiple complex communication signal and communication source pair, and combining all estimated complex communication signals for the communication source into a single estimated complex communication signal for the communication source;
     (c) transform the estimated complex communication signals into real numbers for use with a gradient-based training module;
     (d) use the real numbers and the gradient-based training module to calculate learning rule updates representing changes for the unmixing matrix;
     (e) provide the learning rule update to the unmixing matrix and update the unmixing matrix based on the learning rule update;
     (f) output the single estimated complex communication signal for each communication source; and
     (g) repeat steps a-f for a new period of time.

2. The method of claim 1, wherein the transformation of the estimated complex communication signals into real numbers for use with a gradient-based training module comprises applying the complex communication signals to a hyperbolic tangent function.

3. The method of claim 1, wherein outputting the single estimated complex communication signal for each communication source comprises building an output buffer in a memory device for each communication source.

4. The method of claim 1, wherein outputting the single estimated complex communication signal for each communication source comprises transmitting each source's estimated complex communication signal to a downstream module configured to interpret the estimated complex communication signal for that source.

5. The method of claim 1, wherein the unmixing matrix is recursively updated using the learning rule updates.

6. The method of claim 1, wherein the multiple sensors are a part of an antenna array.

7. An apparatus for separating, on a communication channel, multiple complex communication signals originating from corresponding multiple communication sources, comprising:
   a module for estimating separate complex communication signals from mixed signals using an unmixing matrix;
   a module for recursively updating the unmixing matrix by transforming the estimated complex communication signals into real numbers for use with a gradient-based training module, the gradient-based training module configured to use the real numbers to calculate learning rule updates to apply to the unmixing matrix, wherein the gradient-based training module is configured to minimize error in the signal estimation obtained by application of the unmixing matrix.

8. The apparatus of claim 7, wherein the transformation of the estimated complex communication signals into real numbers comprises:
   applying the complex communication signals to a hyperbolic tangent function.

9. The apparatus of claim 7, wherein the module for estimating and the module for recursively updating are computer code modules stored in a memory device of the apparatus and executable by a processor.

10. The apparatus of claim 9, wherein the memory device is embedded in the processor.

11. The apparatus of claim 7, further comprising:
    an output interface configured to communicate the estimated separate complex communications signals to at least one downstream device for interpreting the estimated separate complex communication signals.

12. The apparatus of claim 7, wherein the gradient-based training module implements a stochastic gradient adaptive algorithm.

13. The apparatus of claim 7, wherein the gradient-based training module is configured to minimize a cost function that quantifies the error in the signal estimation obtained by application of the unmixing matrix.

14. The apparatus of claim 7, further comprising:

a plurality of sensors that provide the mixed signals to the module for estimating.

15. The apparatus of claim 14, wherein the plurality of sensors form a fixed antenna array.

16. The apparatus of claim 14, wherein the plurality of sensors are mobile and form a variable antenna array.

17. The apparatus of claim 7, further comprising:

an input interface for receiving the mixed signals from a plurality of sensors.

18. The apparatus of claim 17, wherein the module for estimating is configured to:

apply the unmixing matrix to a mixed signal from every sensor to obtain a plurality of signal estimations for each source;

combine the plurality of signal estimations for each source to obtain each estimated separate complex communications signal.

19. A method for separating, on a communication channel, multiple complex communication signals originating from corresponding multiple communication sources, comprising:

estimating separate complex communication signals from mixed signals using an unmixing matrix;

recursively updating the unmixing matrix by transforming the estimated complex communication signals into real numbers for use with a gradient-based training module, the gradient-based training module configured to use the real numbers to calculate learning rule updates to apply to the unmixing matrix, wherein the gradient-based training module is configured to minimize error in the signal estimation obtained by application of the unmixing matrix.

20. The method of claim 19, wherein the transformation of the estimated complex communication signals into real numbers comprises:

applying the complex communication signals to a hyperbolic tangent function.

* * * * *